(12) United States Patent
O'Neill et al.

(10) Patent No.: US 7,012,612 B1
(45) Date of Patent: Mar. 14, 2006

(54) CONTEXT DEPENDENT IMAGE CACHING

(75) Inventors: Thomas G. O'Neill, Mountain View, CA (US); Jordan M. Slott, Durham, NC (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/754,681

(22) Filed: Jan. 9, 2004

Related U.S. Application Data

(63) Continuation-in-part of application No. 10/622,956, filed on Jul. 18, 2003, which is a continuation-in-part of application No. 10/449,540, filed on May 29, 2003, and a continuation-in-part of application No. 10/385,759, filed on Mar. 10, 2003, which is a continuation-in-part of application No. 10/247,907, filed on Sep. 20, 2002, which is a continuation-in-part of application No. 10/194,123, filed on Jul. 11, 2002, and a continuation-in-part of application No. 10/623,058, filed on Jul. 17, 2003.

(51) Int. Cl.
G09G 5/36 (2006.01)
G06F 12/00 (2006.01)

(52) U.S. Cl. .................... 345/557; 711/118; 711/144
(58) Field of Classification Search ................ 345/557, 345/530, 537; 711/118, 144, 145
See application file for complete search history.

(56) References Cited

U.S. PATENT DOCUMENTS

| | | | | |
|---|---|---|---|---|
| 4,555,775 A | * | 11/1985 | Pike ........................... | 715/790 |
| 5,020,003 A | | 5/1991 | Moshenberg ................ | 364/518 |
| 5,179,651 A | * | 1/1993 | Taaffe et al. ................ | 345/555 |
| 5,212,770 A | * | 5/1993 | Smith et al. ................ | 715/746 |
| 5,241,625 A | * | 8/1993 | Epard et al. ................ | 345/502 |
| 5,392,391 A | | 2/1995 | Caulk, Jr. et al. ........... | 395/162 |
| 5,440,686 A | * | 8/1995 | Dahman et al. ............. | 345/537 |
| 5,603,034 A | * | 2/1997 | Swanson .................... | 717/111 |
| 5,757,386 A | * | 5/1998 | Celi et al. ................... | 345/548 |
| 5,883,640 A | * | 3/1999 | Hsieh et al. ................. | 345/503 |
| 5,917,504 A | | 6/1999 | Yutaka et al. ............... | 345/509 |
| 5,936,616 A | | 8/1999 | Torborg, Jr. et al. ........ | 345/202 |
| 5,986,661 A | | 11/1999 | Hemingway ................. | 345/421 |
| 6,006,013 A | | 12/1999 | Rumph et al. ............... | 395/114 |
| 6,031,550 A | | 2/2000 | Larson ....................... | 345/511 |
| 6,049,330 A | | 4/2000 | Redford ....................... | 345/202 |
| 6,064,771 A | | 5/2000 | Migdal et al. ............... | 382/232 |
| 6,097,388 A | * | 8/2000 | Goodfellow ................. | 715/807 |
| 6,300,953 B1 | * | 10/2001 | Rivard et al. ............... | 345/582 |
| 6,304,928 B1 | * | 10/2001 | Mairs et al. ................. | 710/68 |
| 6,366,289 B1 | | 4/2002 | Johns .......................... | 345/543 |

(Continued)

OTHER PUBLICATIONS

Howe, D., "least recently used", *The Free Online Dictionary of Computing*, p. 1 [Online ], Feb. 15, 1995. Retrieved from the Internet on Jun. 7, 2005. Retrieved from the Internet: <URL:http://burks.brighton.ac.uk/burks/foldoc/72/65.htm>.

(Continued)

*Primary Examiner*—Kee M. Tung
*Assistant Examiner*—Joni Hsu
(74) *Attorney, Agent, or Firm*—Gunnison, McKay & Hodgson, L.L.P.; Philip J. McKay

(57) ABSTRACT

A mechanism is provided that identifies certain classes of images that are likely to be re-used, and utilizes this information to manage a cache better. This may include flushing certain classes of images that are less likely to be re-used before flushing the classes that are more likely to be reused. In addition, or alternatively, other factors regarding the image may be utilized to determine whether or not caching of the image should occur.

3 Claims, 14 Drawing Sheets

U.S. PATENT DOCUMENTS

| | | | |
|---|---|---|---|
| 6,633,299 B1 * | 10/2003 | Sreenivas et al. | 345/557 |
| 6,721,852 B1 * | 4/2004 | Shanahan et al. | 711/133 |
| 6,751,356 B1 | 6/2004 | Oki | 382/240 |
| 2002/0021455 A1 | 2/2002 | Ishii et al. | 358/1.15 |
| 2002/0035596 A1 | 3/2002 | Yang et al. | 709/203 |
| 2002/0093506 A1 * | 7/2002 | Hobson | 345/553 |
| 2002/0180757 A1 | 12/2002 | Duerr et al. | 345/620 |
| 2003/0028728 A1 | 2/2003 | Ito | 711/118 |
| 2003/0191859 A1 | 10/2003 | Ramsey | 709/247 |
| 2004/0002327 A1 | 1/2004 | Tanaka | 455/418 |
| 2004/0010543 A1 | 1/2004 | Grobman | 709/203 |
| 2004/0059877 A1 * | 3/2004 | Brown et al. | 711/144 |

OTHER PUBLICATIONS

Wales, J., "Hash Table", *Wikipedia, The Free Encyclopedia*, pp. 1-6 [Online]. Retrieved from the Internet on Nov. 30, 2004. Retrieved from the Internet: <URL:http://en.wikipedia.org/wiki/Hash_table>.

"Width vs. Pitch", *DirectX 9.0 C++*, p. 1 [Online]. Retrieved from the Internet on Apr. 11, 2005. Retrieved from the Internet: <URL:http://msdn.microsoft.com/library/en-us/directx9_c/directx/graphics/ProgrammingGuide/GettingStarted/Direct3Dsurfaces/widthvspitch.asp>. No author provided.

* cited by examiner

CONTEXT DEPENDENT IMAGE CACHING

CROSS-REFERENCE TO RELATED APPLICATION

The present application is a continuation-in-part of application Ser. No. 10/622,956, filed on Jul. 18, 2003, by Jordan M. Slott and Thomas G. O'Neill, entitled "Transmitting And Displaying Composite Images", which is a continuation-in-part of application Ser. No. 10/449,540, filed on May 29, 2003, by Jordan M. Slott and Thomas G. O'Neill, entitled "Caching Backing-Store Images To Reduce Bandwidth", and of application Ser. No. 10/385,759, filed on Mar. 10, 2003, by Thomas G. O'Neill and Jordan M. Slott, entitled, "Tagging Repeating Images For Improved Compression", which is a continuation-in-part of co-pending application Ser. No. 10/247,907, filed on Sep. 20, 2002, by Thomas G. O'Neill and Jordan M. Slott, entitled "Tagging Single-Color Images For Improved Compression", which is a continuation in part of co-pending application Ser. No. 10/194,123, filed on Jul. 11, 2002, by Thomas G. O'Neill and Jordan M. Slott, entitled "Tagging Multicolor Images For Improved Compression", and of application Ser. No. 10/623,058, filed on Jul. 17, 2003, by Jordan M. Slott and Thomas G. O'Neill, entitled "Caching Fonts For Improved Bandwidth of Transmitted Text".

FIELD OF THE INVENTION

The present invention relates to the field of computer graphics. More particularly, the present invention relates to the context-dependent caching of images in order to improve bandwidth.

BACKGROUND OF THE INVENTION

Remote computing applications where screen information is generated on one computer (a "host") and transmitted for display on another computer ("a display") are growing in popularity. Examples of some display computers include multipurpose PCs, thin-clients, and Personal Digital Assistants (PDAs).

The X Windows System is a standard that utilizes X client software and X server software to enable the updating of displays at the requests of X client applications. The X server software runs on the host computer. An X client application, which may be running on a different computer, communicates with the X server software by utilizing a low-level library of routines known as Xlib. Xlib provides the functions required to connect to display servers, create windows, render graphics, respond to events, etc. The X server software then may interface with display drivers to actually render the graphics on the display.

X is frequently used as a "local display application", where the X-server and display are both on the same computer. That is, the same computer is both the "host" and "display" computer. Examples of this usage include running an X-server on a workstation or on an X-terminal. An X-terminal typically has a computer processor, graphics subsystem and display, but no hard drive. Applications running on other computers use the Xlib routines to communicate with the X-server software running on the X-terminal.

While in some contexts it is advantageous to have the X server and the display on the same computer, this is not necessarily the case in other contexts. One specific context that will be discussed is a remote display application. In such a design, client applications make requests of a centralized server or servers (here known collectively as the "host computer"). The host computer then manages one or more "display computers", which are typically simple terminal devices.

The Sun Ray™ appliance from Sun Microsystems, Inc. of Palo Alto, Calif. is an example of a thin client which serves as a "display computer" in a remote computing application. A Sun Ray™ appliance has a processor, graphics subsystem and display, but no hard drive. A Sun Ray™ appliance is a "display" computer and runs its own proprietary software. The Sun Ray™ server is the "host" computer and runs the X-server software. The full screen image is maintained both in RAM on the host computer as well as in the frame buffer of the Sun Ray™ appliance's video card. In order to synchronize the displays, the host computer sends screen update information to the Sun Ray™ appliance via a network protocol known as NewT. The Sun Ray™ appliance uses the protocol commands to update the state of its hardware frame buffer.

One way to reduce bandwidth and CPU usage is for the display computer to maintain a cache of images it has seen. If the images occur on the screen again, the server can direct the client to use the cached image rather than sending the image again from scratch. Due to limitations in the size of the image cache, however, older images must sometimes be removed ("flushed") from the cache to make room for new images. If a flushed image subsequently recurs on the screen, a cache "miss" occurs and the image must be resent from scratch.

Prior art implementations typically use a least-recently used (LRU) algorithm to determine which image(s) to flush. Here, the image that has gone the longest without recurring on the screen is flushed. Unfortunately, this algorithm flushes images without regard for their contents or types. Some types of images are more likely to be re-used than others. What is needed is a solution that allows the system to make a more intelligent decision as to which image(s) to flush from the cache.

BRIEF DESCRIPTION

A mechanism is provided that identifies certain classes of images that are likely to be re-used, and utilizes this information to manage a cache better. This may include flushing certain classes of images that are less likely to be re-used before flushing the classes that are more likely to be reused. In addition, or alternatively, other factors regarding the image may be utilized to determine whether or not caching of the image should occur.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the present application, an embodiment of the present invention is described in the context of a modification of traditional X Windows technology for use with remote computing applications. However, one of ordinary skill in the art will recognize that other embodiments are possible and the present invention should not be limited to X Windows, Sun Ray™, or remote computing technology.

In remote display applications based on an X server, the Device Dependent (DDX) layer of the X server may be modified to include possible compression of the screen data and transmission of remote display protocol commands to the display computer. The DDX provides a software interface to a conceptual hardware device. In a specific embodiment of the present invention, the desired results can be accomplished by modifying the DDX, without changing the DIX.

Figure 1:
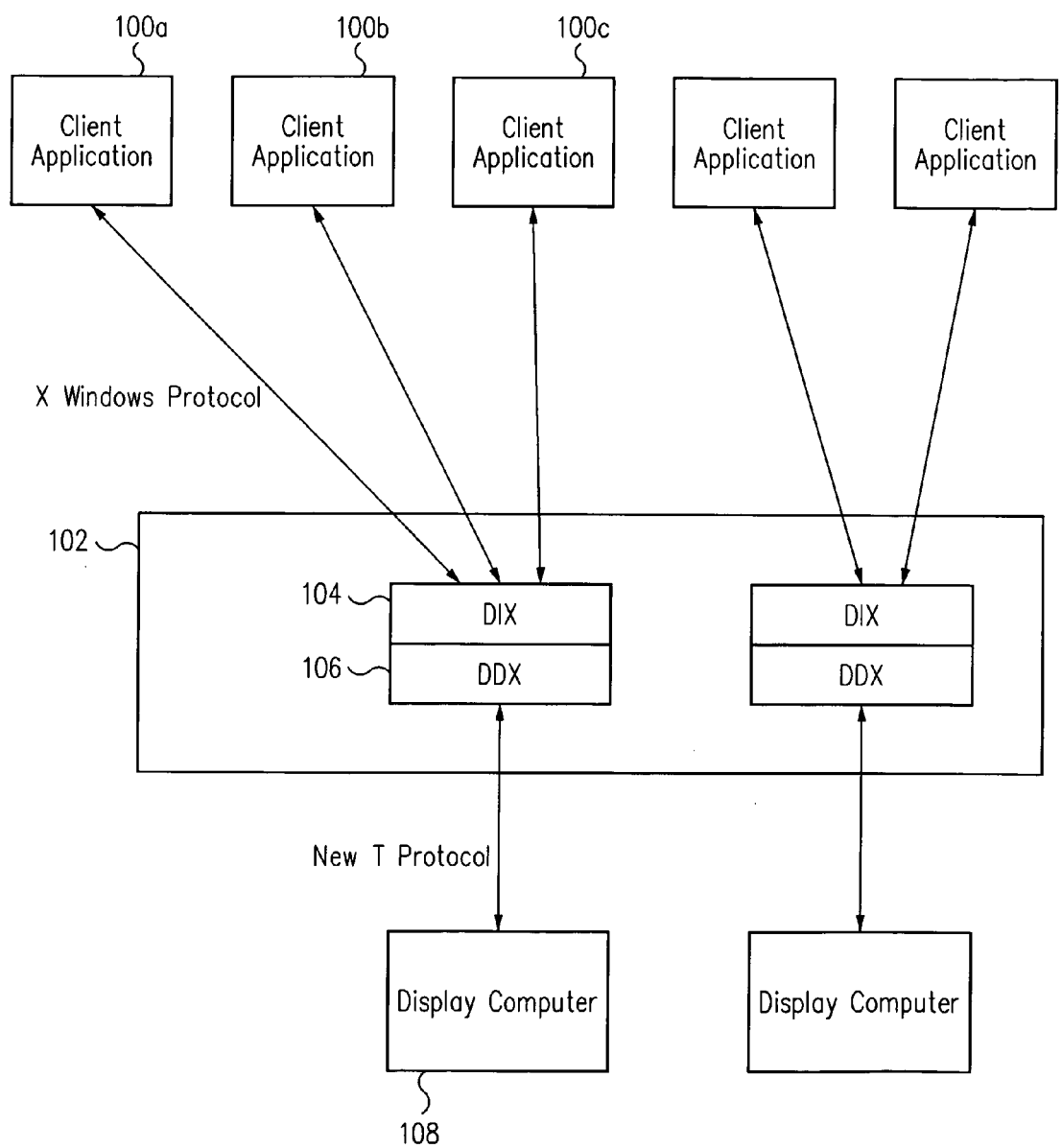
FIG. 1 is a block diagram illustrating a remote display application such as a Sun Ray™ network.

FIG. 1 is a block diagram illustrating a remote display application such as a Sun Ray™ network. Client applications 100a–100c send information to and receive information from the host computer 102 over the X Windows Protocol. The host computer utilizes a device independent layer (DIX) 104 to act as a controlling layer, which handles initialization procedures and all device-independent handling of requests and events. A device dependent layer (DDX) 106 then is used to handle device dependent functionality. The DDX 106 then communicates with display computer 108 using the NewT protocol. The DIX and the DDX essentially make up an X-server.

Figure 2:
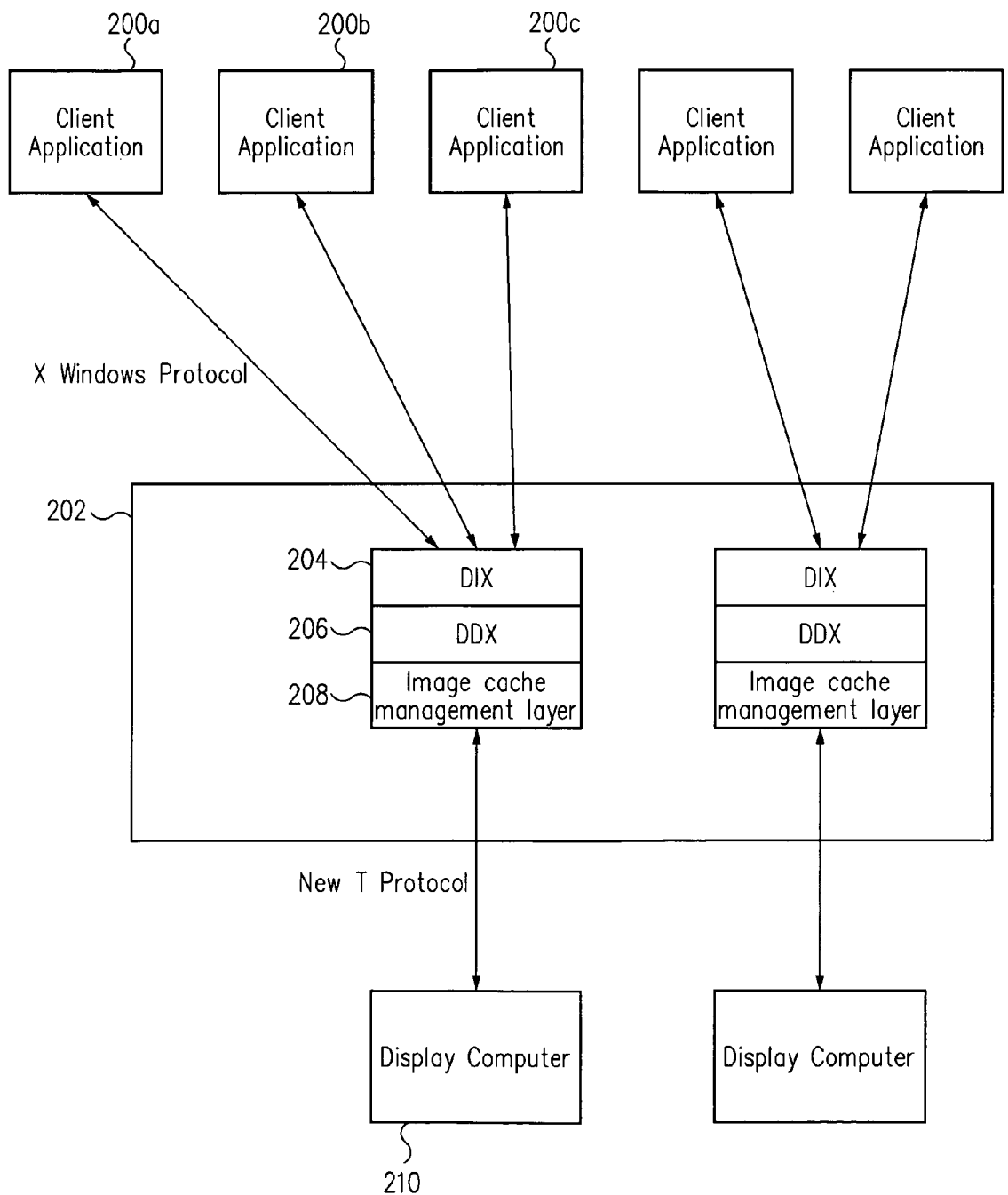
FIG. 2 is a block diagram illustrating a remote display application in accordance with an embodiment of the present invention.

FIG. 2 is a block diagram illustrating a remote display application in accordance with an embodiment of the present invention. Client applications 200a–200c send information to and receive information from the host computer 202 over the X Windows Protocol. The host computer utilizes a device independent layer (DIX) 204 to act as a controlling layer, which handles initialization procedures and all device-independent handling of requests and events. A device dependent layer (DDX) 206 then is used to handle device dependent functionality. An image cache management layer 208 may then be provided which performs the additional cache management techniques discussed in the present application. Alternatively, this cache management layer may simply be part of a modified DDX. The image cache management management layer 208 then communicates with display computer 210 using an enhanced version of the NewT protocol.

The present invention provides a mechanism that identifies certain classes of images that are likely to be re-used, and utilizes this information to manage a cache better. This may include flushing certain classes of images that are less likely to be re-used before flushing the classes that are more likely to be reused. However, one of ordinary skill in the art will recognize it could be modified in a way so as to simply not cache, or be less likely to cache, images that are less likely to be used, as that will have the same effect (i.e., the cache being filled with images that are more likely to be reused than those uncached).

In an embodiment of the present invention, the cache itself is located on the display computer but it is administered by the host computer. The host computer keeps a record of the size of the cache and how much of it is occupied at any point. The host computer can then determine whether an image can fit in the cache without first asking the display computer. This is done so that the cache management protocol commands do not need return values.

In the X-server, images that are more likely to be re-used include backing store pixmaps, non-backing-store pixmaps, tile images, and font character images. A backing store pixmap is used by the X-server to store a temporarily obscured portion of a window's image (e.g., when the window is obscured by another window being moved across it, or by a temporary window such as a menu). As the obscured portion is likely to be obscured only temporarily, there is a high likelihood that it will need to be re-used. In this application, it should be understood that "backing store pixmaps" describe pixmaps that are used to provide both backing store and save under images.

A non-backing store pixmap is often used by an X client application to store an image that it expects to re-use often (e.g., a browser might store the images of its navigation icons in pixmaps). This way, the client application can use a low-bandwidth XCopyArea X protocol command to repaint the image instead of having to use a high-bandwidth XPutImage command. An image drawn using XCopyArea from a pixmap is therefore more likely to be re-used than one drawn using XPutImage.

It may be useful to treat back buffer pixmaps separately from other non-backing store pixmaps, for example if these are found to have a different re-use probability. Back buffer pixmaps are typically used to construct complex images off-screen and then copy them on screen to give an "instantaneous" update. Factors indicating a likelihood that a pixmap is being used as a back buffer include:

1. The pixmap is large.
2. The pixmap is copied to the screen repeatedly.
3. The pixmap contains more than one type of image data (e.g., low- and high-color regions).
4. At least part of the pixmap is modified between copies A tile image is typically used for a window background area. These images are typically reused any time the visible portion of the window is changed, and so have a high re-use probability. Sometimes such re-use may be provided for by the caching of backing store pixmaps. But in other circumstances the caching of tile images may be useful instead. Examples of such circumstances are:

1. Windows for which backing store and/or save unders are not enabled.
2. Changes in the visible portion of a window that do not trigger its backing store mechanism. Examples include a) restoring the window from an icon, b) unobscuring a window that was covered by another permanent window, and c) changing the size of the window.

In many X Windows window managers, an important example of case 1 is the workspace (or "desktop") window. The visible portion of the workspace window changes very frequently in typical use, so it may be especially important to cache its background tile image if one is used. (If the workspace window is single-color rather than tiled, then there is no need to cache it.). This may be especially true if the tile size of the background image is very large (e.g., full-screen), and so would require a lot of bandwidth if it had to be transmitted from scratch. Candidates for the workspace window may be identified by various traits such as: a) its size is (nearly) full-screen, b) its background is tiled, c) the window is never drawn to (i.e., any images that occur on top of the background are actually in a different window), d) it has backing store and save unders disabled, e) it has no border, f) it is at some time at least partially visible, and g) its visible region changes frequently. Note some workspace managers provide multiple virtual workspaces, and so more than one workspace image may need to be cached.

The character images for a common font are also likely to be re-used many times and so are useful to cache. Because text tends to occur in strings of characters in the same font, it is useful to treat the entire font as an entity rather than as a set of unrelated character images. For simplicity, the caching of character images will not be discussed much in the present document. But one of ordinary skill in the art will recognize that the font cache can share the memory with the ordinary image cache, and that cached images in a font can be subjected to the same kind of quality level determinations as the other types of images.

Furthermore, there are some classes of images that have a low probability of re-use and thus may wish to flush more easily (or simply not cache). The first of these are images that were in a pixmap (backing store or otherwise) that has since been destroyed. Destruction of the pixmap implies that the X-server or X-application is done with the image. The second are images that were drawn with a PutImage directly to a realized window (as opposed to a pixmap). This implies that the X application program does not expect to use them again. The third are tile images that were drawn only in a window that no longer exists.

Roughly speaking, the cache effectiveness should be maximized if images are cached and flushed according to the product of the expected number of reuses and the bandwidth saved per reuse. The expected number of reuses may be approximately computed based on the number of uses so far, the time since the last use, and the re-use probability for the appropriate image class. The bandwidth saved per reuse can be determined by explicitly calling the compression routines that would be used to compress the image for sending. Or it can be determined approximately using such factors as the size of the image, the number of unique colors in the image, and the fraction of the image occupied by many-colored images. The bandwidth saved should also take into account what fraction of the pixmap is likely to be correct in the cache by the time re-use occurs. That is, little is gained by caching a pixmap whose image is extensively modified before reuse.

For pixmap images in the cache, additional benefits may be realized. A unique pixmap identifier (e.g., the pixmap ID or pointer value) can be used as the cache index, instead of the image hash value. This saves the hash-computation overhead. A "valid region" can be attached to each pixmap giving the region of the pixmap for which the display computer has an accurate copy in the image cache. This provides the advantage that the display computer can cache and access partial copies of a pixmap's image, something for which a hashing-based cache cannot be used. Lastly, when a pixmap to pixmap copy occurs on the host computer and the source pixmap is cached, the host computer can direct the display computer to perform the equivalent copy between cache entries (a new cache entry may need to be created for the destination pixmap). Such an optimization would be much more difficult in a prior-art image cache that did not associate cache entries with individual pixmaps.

In a hash-based cache, two occurrences of the same image will be thought to be completely unrelated if they contain different portions of the source image or if the source image has been modified at all. Thus, an embodiment of the present invention allows use of the cache in the following scenarios when a hash-based cache would not:

1. An entire pixmap image is copied to the screen. Later on, part of the image is copied to the screen again. The second occurrence comes from the cache.
2. Part of a pixmap image is copied to the screen. Later on the entire image is copied. At this point, the previously-seen portion—as determined by the valid region—comes from the cache and only the new portion needs to be sent from scratch.
3. A pixmap image is copied to the screen. Later on, part of the pixmap image is modified. Then the pixmap is copied to the screen again. At this point, the portion of the pixmap that was not modified—as determined by the valid region—comes from the cache. The rest is sent from scratch.

In these cases, the hashes of the new image and the cached image differ but the pixmap identifier is the same.

In the X server, tile images are typically specified using a pixmap. Thus, tile images may be treated the same way as backing store and non-backing store pixmaps. But in some cases a tile image may recur on the screen without an explicit reference to the tile image pixmap. Furthermore, tile images tend to be static, so there is no need for the "valid region" mechanism or for handling pixmap to tile copies. Thus it may also be useful to have the tile image cache entries be independent of the pixmap, in which case the image hash may be used instead of a pixmap identifier.

In an embodiment of the present invention, it may furthermore be useful to segregate the various image cache entries in the cache lookup table. That way the host computer need not spend time checking, for example, tile image cache entries, when it is looking for a backing store pixmap entry. However, the cache entries could still share a common memory pool for efficiency.

Figure 3:
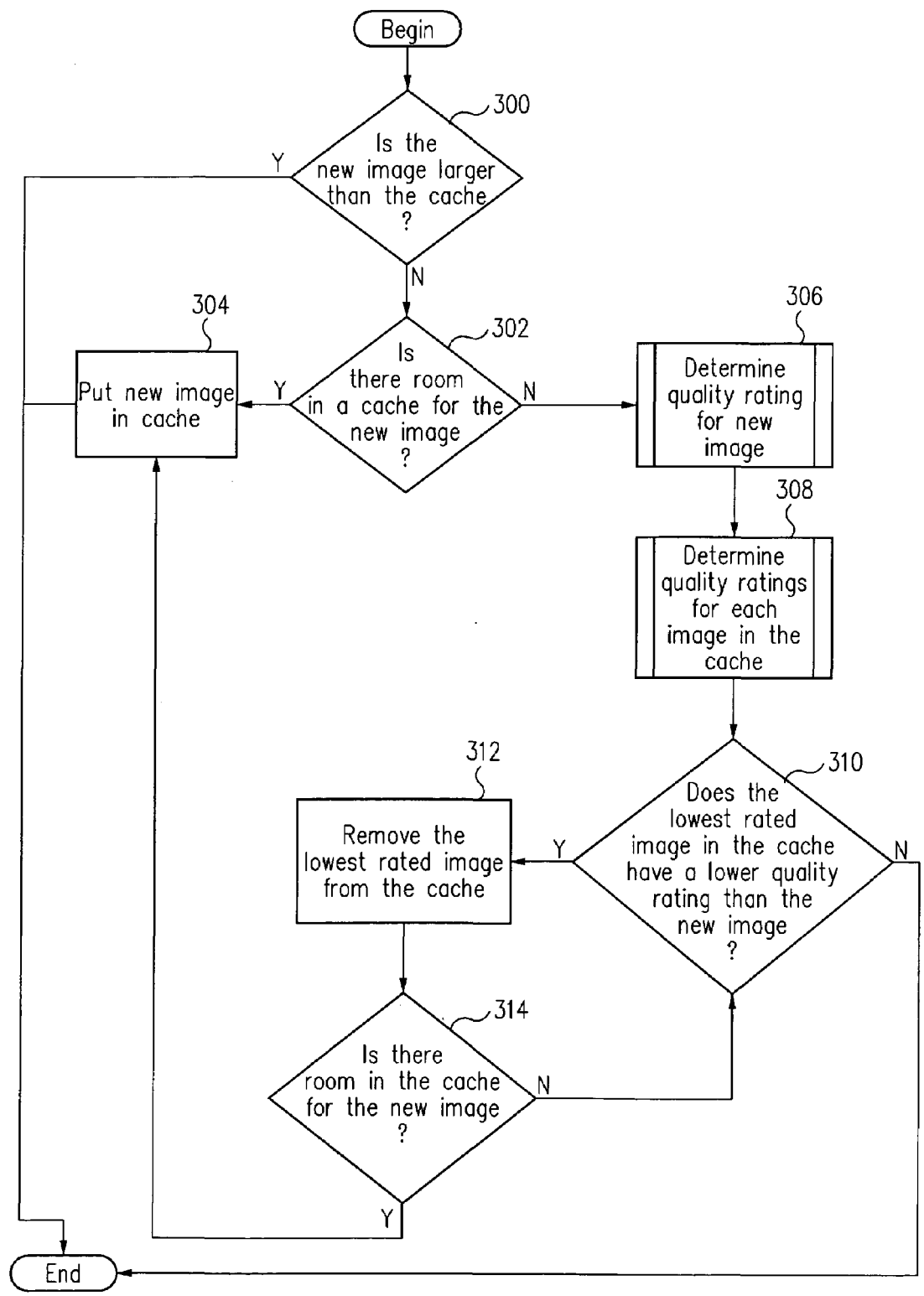
FIG. 3 is a flow diagram illustrating a method for managing an image cache in a display computer in a computer system having a host computer and a display computer in accordance with an embodiment of the present invention.
Figure 4:
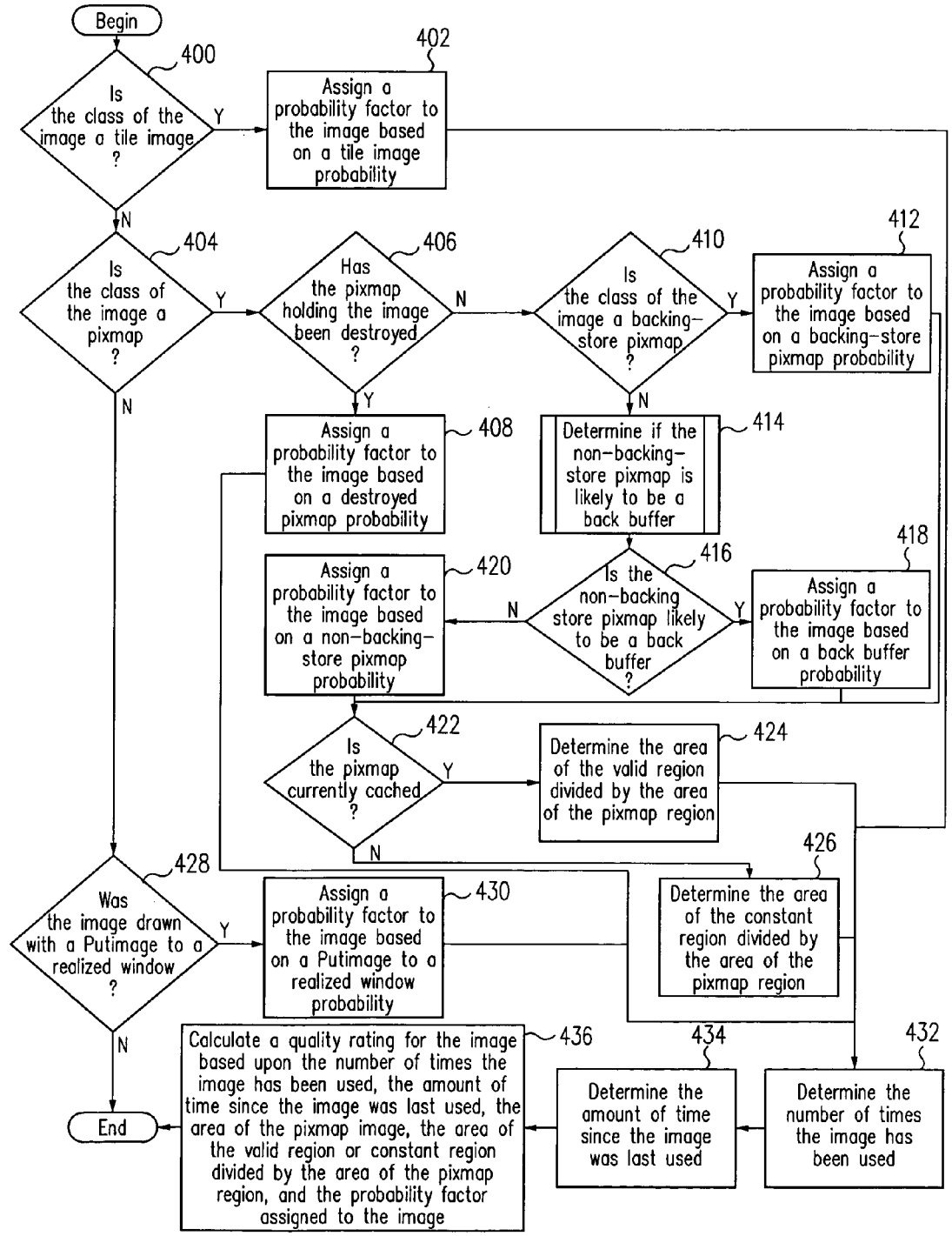
FIG. 4 is a flow diagram illustrating a method for determining a quality rating for an image in accordance with an embodiment of the present invention.

FIG. 3 is a flow diagram illustrating a method for managing an image cache in a display computer in a computer system having a host computer and a display computer in accordance with an embodiment of the present invention. This method may be performed on a host computer when a new image is meant to be displayed on a display computer. The display computer may store the cache in its memory, but the cache may be administered by the host computer. At 300, it may be determined if the new image is larger than the cache. If so, it cannot be cached, and the process may simply end. If not, then at 302, it may be determined if there is enough unused room in a cache for the new image. If there is room in the cache, then at 304 the new image may simply be put into the cache. If not, then at 306 a quality rating for the new image may be determined. FIG. 4 is a flow diagram illustrating a method for determining a quality rating for an image in accordance with an embodiment of the present invention. One of ordinary skill in the art will recognize that this is only one possible method, provided merely for illustration. At 400, it may be determined if the class of the image is a tile image. If so, then at 402 a probability factor may be assigned to the image based on a tile image probability. While the term probability often denotes a number between 0 and 1, for purposes of this document, a probability factor may be on any scale, and the term should be interpreted as such.

Figure 5:
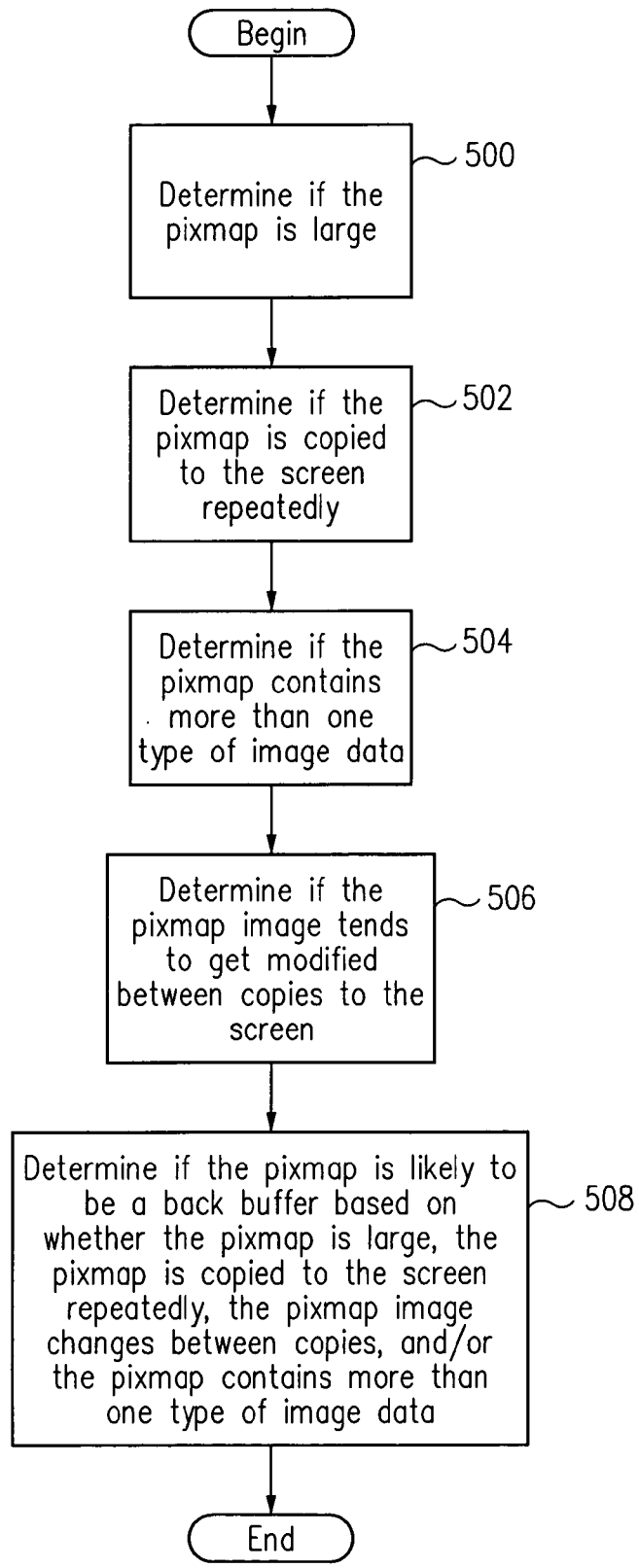
FIG. 5 is a flow diagram illustrating a method for determining if a non-backing-store pixmap is likely to be a back buffer in accordance with an embodiment of the present invention.

If at 400 it was determined that the class of the image is not a tile image, then at 404 it may be determined if the class of the image is a pixmap. If so, then at 406 it may be determined if the pixmap holding the image has been destroyed. If so, then at 408 a probability factor may be assigned to the image based on a destroyed pixmap probability. If the pixmap holding the image has not been destroyed, then at 410 it may be determined if the class of the image is a backing-store pixmap. If so, then at 412 a probability factor may be assigned to the image based on a backing-store pixmap probability. If not, then at 414 it may be determined if the non-backing-store pixmap is likely to be a back buffer. FIG. 5 is a flow diagram illustrating a method for determining if a non-backing-store pixmap is likely to be a back buffer in accordance with an embodiment of the present invention. At 500, it may be determined if the pixmap is large. At 502, it may be determined if the pixmap is copied to the screen repeatedly. At 504, it may be determined if the pixmap contains more than one type of image data. At 506, it may be determined if the pixmap image tends to get modified between copies to the screen. At 508, it may be determined if the pixmap is likely to be a back buffer based on whether the pixmap is large, the pixmap is copied to the screen repeatedly, the pixmap image changes between copies, and/or the pixmap contains more than one type of image data.

Referring back to FIG. 4, at 416 the result of the back buffer determination is examined. If the non-backing-store pixmap is likely to be a back buffer, then at 418 a probability factor may be assigned to the image based on a back-buffer probability. If not, then at 420, a probability factor may be assigned to the image based on a non-backing-store pixmap probability. Then at 422, it may be determined if the pixmap is currently cached. If so, then at 424, the area of the valid region divided by the area of the pixmap region may be determined. If not, then at 426, the area of the constant region divided by the area of the pixmap region may be determined.

If at 404 it is determined that the class of the image is not a pixmap, then at 428 it may be determined if the image was drawn with a PutImage to a realized window. If so, then at 430, a probability factor may be assigned to the image based on a PutImage to a realized window probability.

Once a probability factor has been assigned to the image, at 432 the number of times the image has been used (i.e., at least partially drawn to the screen) may be determined. Then at 434, the amount of time since the image was last used may be determined. Finally, at 436, a quality rating for the image may be calculated based on the number of times the image has been used, the amount of time since the image was last used, the area of the pixmap image, the area of the valid region divided by the area of the pixmap region, the ratio of the area of a constant region to the area of the image, and the probability factor assigned to the image. Other factors may also play a part, including a measure of the amount of bandwidth it would take to transmit the image (such as the number of unique colors), and whether or not the image is a workspace window image.

Referring back to FIG. 3, once the quality rating for the new image is determined, at 308, the quality ratings for each image in the cache may be determined. This may follow the same processes described above in FIGS. 4–5 and the corresponding text. At 310, it may be determined if the lowest rated image in the cache has a lower quality rating than the new image. If not, then it has been determined that none of the images in the cache are less "important" than the new image, and thus the new image will not be cached. If, on the other hand, the lowest rated image in the cache does have a lower quality rating than the new image, then at 312 the lowest rated image may be removed from the cache. At 314, it may be determined if there is room in the cache for the new image. If so, then the process moves to 304 where the new image may be put in the cache. If not, then the process may return to 310.

Figure 6:
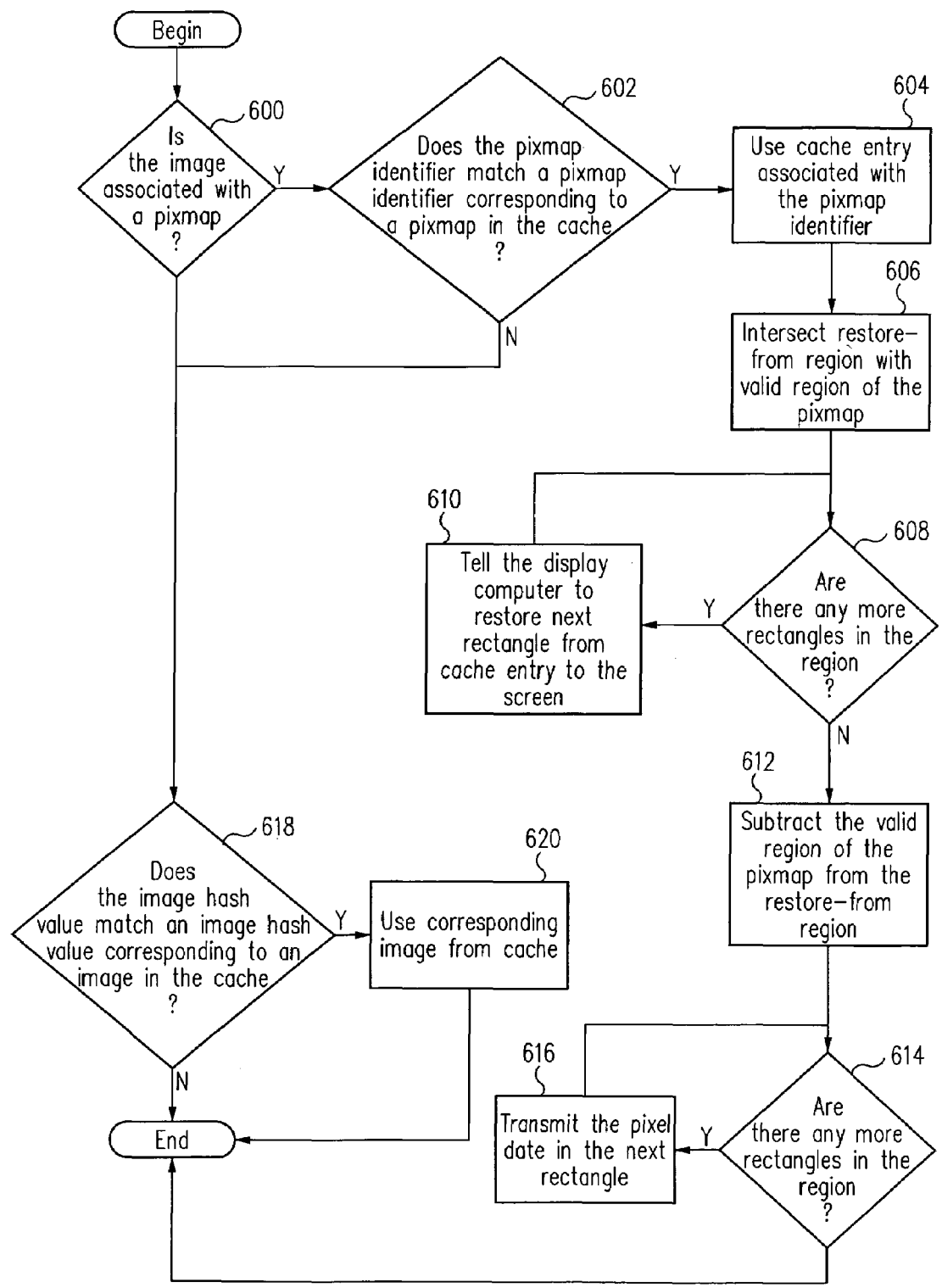
FIG. 6 is a flow diagram illustrating a method for retrieving an entry in a cache corresponding to an image, the cache stored by a display computer in a system having a display computer and a host computer, in accordance with an embodiment of the present invention.

FIG. 6 is a flow diagram illustrating a method for retrieving an entry in a cache corresponding to an image, the cache stored by a display computer in a system having a display computer and a host computer, in accordance with an embodiment of the present invention. At 600, it may be determined if the image is associated with a pixmap. If so, then at 602 it may be determined if the pixmap identifier matches a pixmap identifier corresponding to a pixmap in the cache. If so, then at 604 the cache entry associated with the pixmap identifier may be retrieved. Then at 606, the restore-from region may be intersected with the valid region of the pixmap. At 608, it may be determined if there are any more rectangles in the intersected region. If so, then at 610 the display computer may be told to restore the next rectangle from the cache entry to the screen. This may repeat until there are no more rectangles in the intersected region. At 612, the valid region of the pixmap may be subtracted from the restore-from region. At 614, it may be determined if there are any more rectangles in the region. At 616, the pixel data in the next rectangle may be transmitted. This may repeat until all the rectangles have been transmitted.

If at 600 it is determined that the image is not associated with a pixmap, or if at 602 it is determined that the pixmap identifier doesn't match a pixmap identifier corresponding to a pixmap in the cache, then at 618 it may be determined if the image hash value matches an image hash value corresponding to an image in the cache. If so, then the corresponding image from the cache may be retrieved at 620.

For simplicity the discussion up to this point has focused on caching as much of a pixmap's image as actually appears on screen. In one embodiment, however, only the many-colored portions of the pixmap are cached since these would require the most bandwidth to send. A separate pixmap entry may be used for each of one or more rectangles identified as containing a large number of unique colors. The lookup value into the cache table may be formed from the pixmap identifier plus an indicator of which many-colored rectangle is stored in the corresponding cache entry. The indicator may be an index number or a reference to the coordinates of the many-colored rectangle. One of ordinary skill in the art can see that further refinements are possible, such as storing the full image for images with a high re-use probability and only the many-colored portions for images with a low re-use probability.

Figure 7:
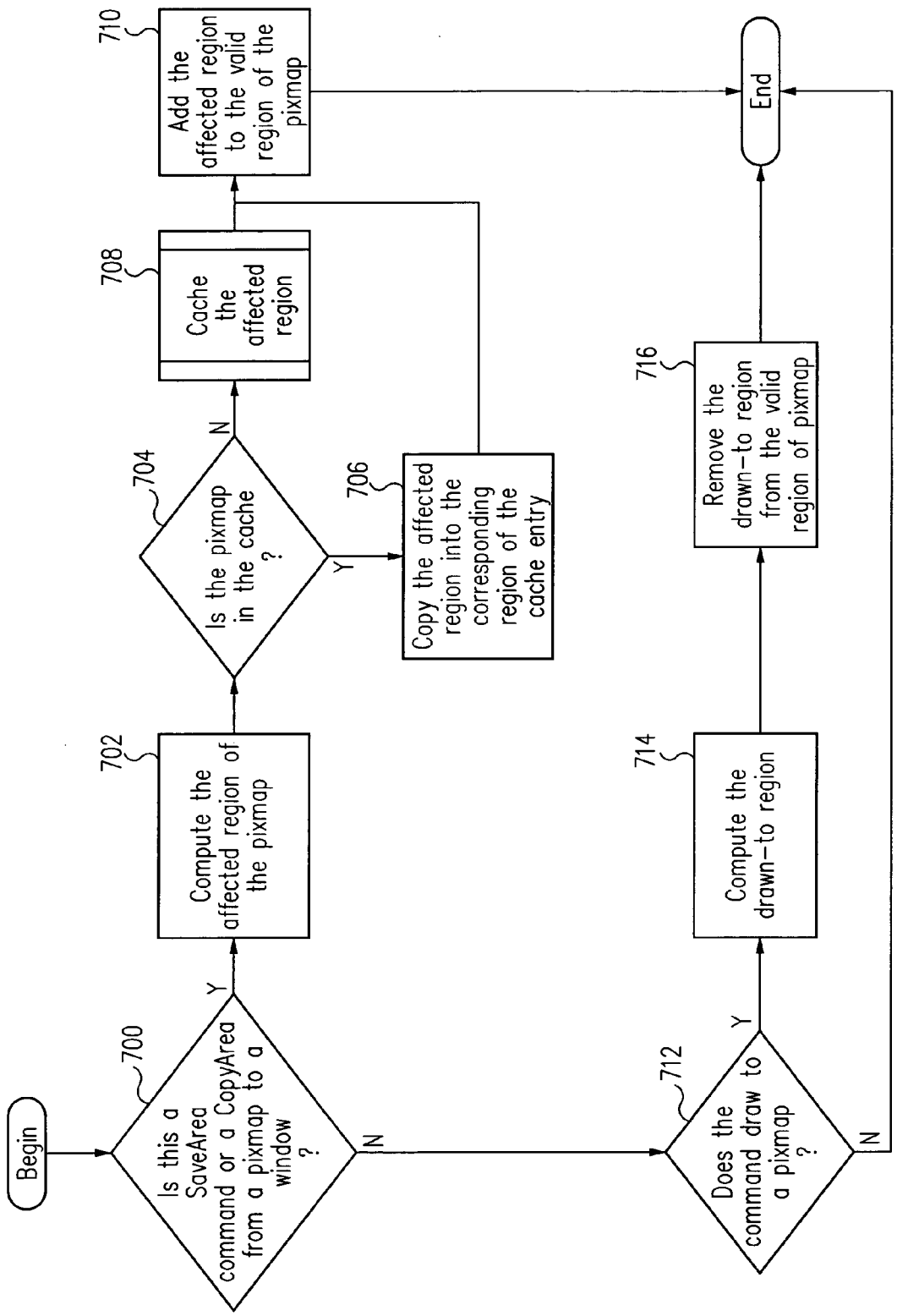
FIG. 7 is a flow diagram illustrating a method for managing a valid region in accordance with an embodiment of the present invention.

FIG. 7 is a flow diagram illustrating a method for managing a valid region in accordance with an embodiment of the present invention. The method may be executed in response to a drawing command. At 700, it may be determined if the command is a SaveArea command or a CopyArea command from a pixmap to a window. If so, then at 702 the affected region of the pixmap may be computed. For SaveArea, the affected region is the pixmaps's drawn-to region. For CopyArea, the affected region is the source region. Then at 704, it may be determined if the pixmap is in the cache. If so, then at 706 the display computer may copy the affected region into the corresponding region of the cache entry. If not, then at 708, the affected region may be cached, such as by the process described in FIG. 3 and the corresponding text above. At 710, the affected region may be added to the valid region of the pixmap.

If at 700 it is determined that the command is neither a SaveArea command or a CopyArea from a pixmap to a window command, then at 712, it may be determined if the command draws to the pixmap. If so, then at 714, the drawn-to region may be computed. Then at 716, the drawn-to region may be removed from the valid region of the pixmap. In principle, pixmap to pixmap copies could be treated more gracefully than as is depicted in FIG. 7. E.g., if both pixmaps are in the cache, then the relevant portion of the cache entry of the source pixmap can be copied into the cache entry of the destination pixmap, increasing the size of the valid region. But for simplicity this option is not illustrated.

Figure 8:
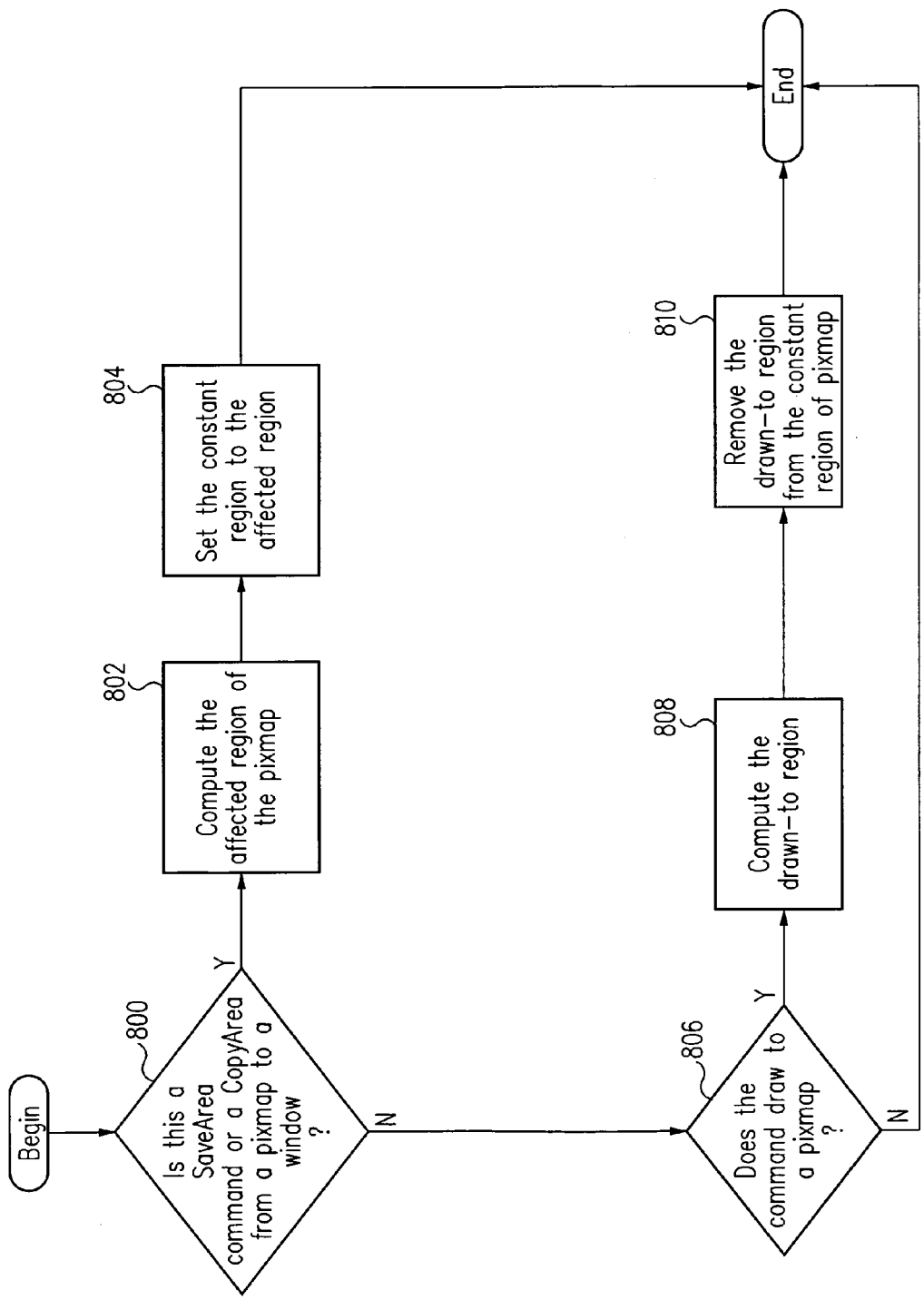
FIG. 8 is a flow diagram illustrating a method for managing a constant region in accordance with an embodiment of the present invention.

FIG. 8 is a flow diagram illustrating a method for managing a constant region in accordance with an embodiment of the present invention. The method may be executed in response to a drawing command. At 800, it may be determined if the command is a SaveArea command or a CopyArea command from a pixmap to a window. If so, then at 802 the affected region of the pixmap may be computed. For SaveArea, the affected region is the pixmaps's drawn-to region. For CopyArea, the affected region is the source region. Then at 804, the constant region may be set to the affected region.

If at 800 it is determined that the command is neither a SaveArea command or a CopyArea from a pixmap to a window command, then at 806, it may be determined if the command draws to the pixmap. If so, then at 808, the drawn-to region may be computed. Then at 810, the drawn-to region may be removed from the constant region of the pixmap.

Figure 9:
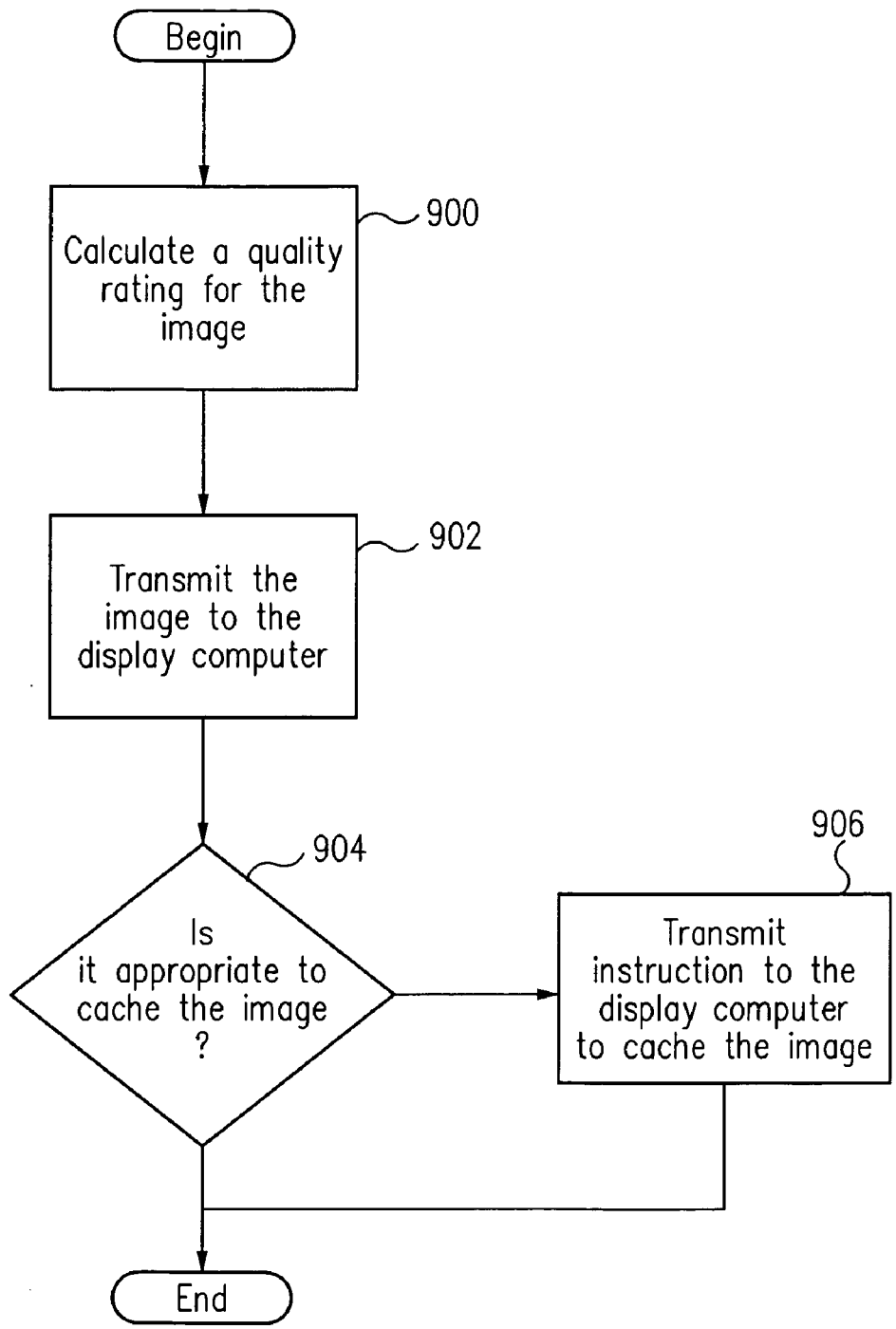
FIG. 9 is a flow diagram illustrating a method for managing an image cache in a display computer in a computer system having a host computer and a display computer in accordance with an embodiment of the present invention.

FIG. 9 is a flow diagram illustrating a method for managing an image cache in a display computer in a computer system having a host computer and a display computer in accordance with an embodiment of the present invention. At 900, a quality rating for the image may be calculated. This may be based on factors such as the probability factor assigned to the image class of the image, the amount of time since the image was last used, the number of times the image has been drawn onto a display, the size of the image, the ratio of the area of a valid region to the area of the image, and the ratio of the area of a constant region to the area of the image. At 902, the image may be transmitted to the display computer. At 904, it may be determined if it is appropriate to cache the image on the display computer, the determination being based on the quality rating of the image. This may be based on whether there is enough room in the cache or if it is possible to create enough room in the cache by removing one or more images with lower quality ratings than the image. If it is deemed appropriate, then at 906 instructions may be transmitted to the display computer to cache the image.

Figure 10:
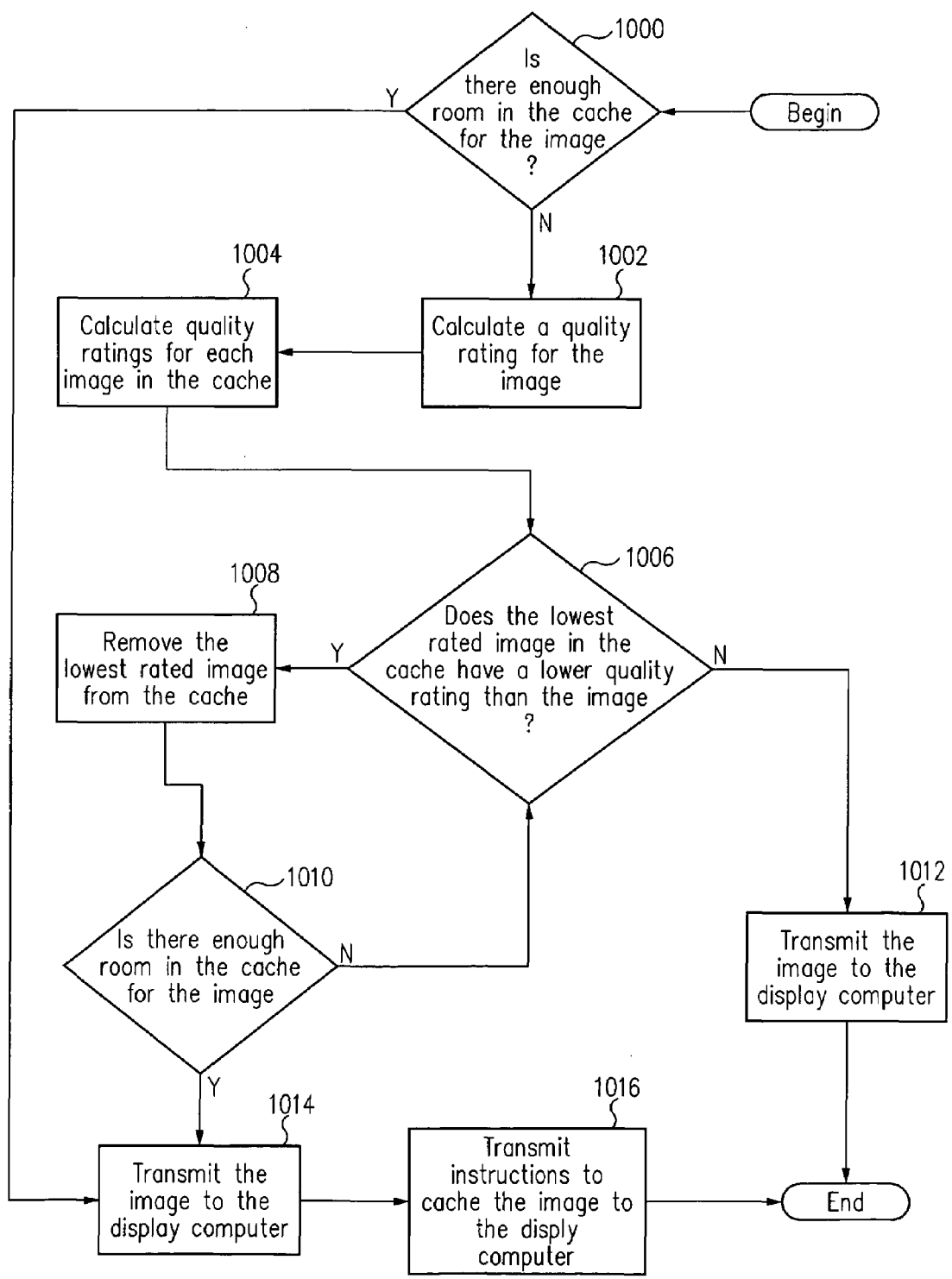
FIG. 10 is a flow diagram illustrating a method for managing an image cache in a display computer in a computer system having a host computer and a display computer in accordance with another embodiment of the present invention.

FIG. 10 is a flow diagram illustrating a method for managing an image cache in a display computer in a computer system having a host computer and a display computer in accordance with another embodiment of the present invention. At 1000, it may be determined if there enough room in the cache for the image. If so, there is no reason to remove any current cache entries, and the process may proceed directly to 1014. If not, then at 1002, a quality rating for the image may be calculated. This may be based on factors such as the probability factor assigned to the image class of the image, the amount of time since the image was last used, the number of times the image has been drawn onto a display, the size of the image, the ratio of the area of a valid region to the area of the image, and the ratio of the area of a constant region to the area of the image. The probability factor may be, for example, a destroyed pixmap probability factor, a backing-store pixmap probability factor, a back buffer probability factor, a non-backing-store pixmap probability factor, a tile image probability factor, a font character image probability factor, or a put image to a realized window probability factor, depending upon the image class of the image. At 1004, quality ratings for each image in the cache may be calculated. These also may be based on factors such as the probability factor assigned to the image class of the image, the amount of time since the image was last used, the number of times the image has been drawn onto a display, the size of the image, the ratio of the area of a valid region to the area of the image, and the ratio of the area of a constant region to the area of the image. At 1006, it may be determined if a lowest rated image in the cache has a lower quality rating than the image. If not, then the image should not be cached and at 1012 the image may simply be transmitted to the display computer. If so, then at 1008 the lowest rated image may be removed from the cache. Then at 1010 it may be determined if there is enough room in the cache for the image. If not, then the process may loop back up to 1006. If there is enough room in the cache for the image, then at 1014, the image may be transmitted to the display computer. Then at 1016, instructions to cache the image may be transmitted to the display computer.

Figure 11:
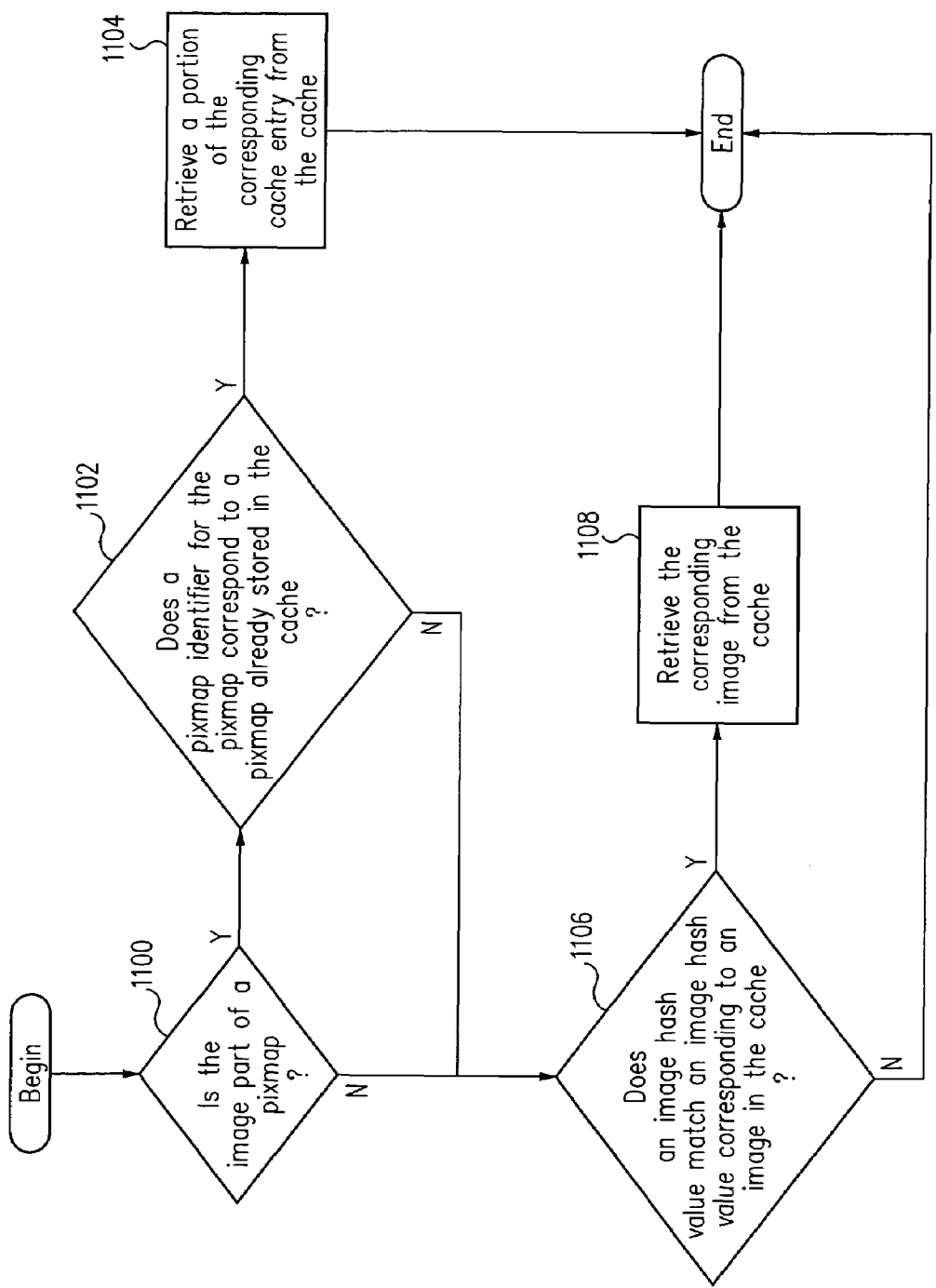
FIG. 11 is a flow diagram illustrating a method for retrieving an entry in a cache corresponding to an image, the cache stored by a display computer in a system having a display computer and a host computer in accordance with an embodiment of the present invention.

FIG. 11 is a flow diagram illustrating a method for retrieving an entry in a cache corresponding to an image, the cache stored by a display computer in a system having a display computer and a host computer in accordance with an embodiment of the present invention. At 1100, it may be determined if the image is part of a pixmap. If so, then at 1102 it may be determined if a pixmap identifier for the pixmap corresponds to a pixmap already stored in the cache. If so, then at 1104 a portion of the corresponding cache entry may be retrieved from the cache. If not, or if at 1100 it was determined that the image is not a part of a pixmap, then at 1106, it may be determined if an image hash value for the image matches an image hash value corresponding to an image in the cache. If so, then at 1108 the corresponding image may be retrieved from the cache.

Figure 12:
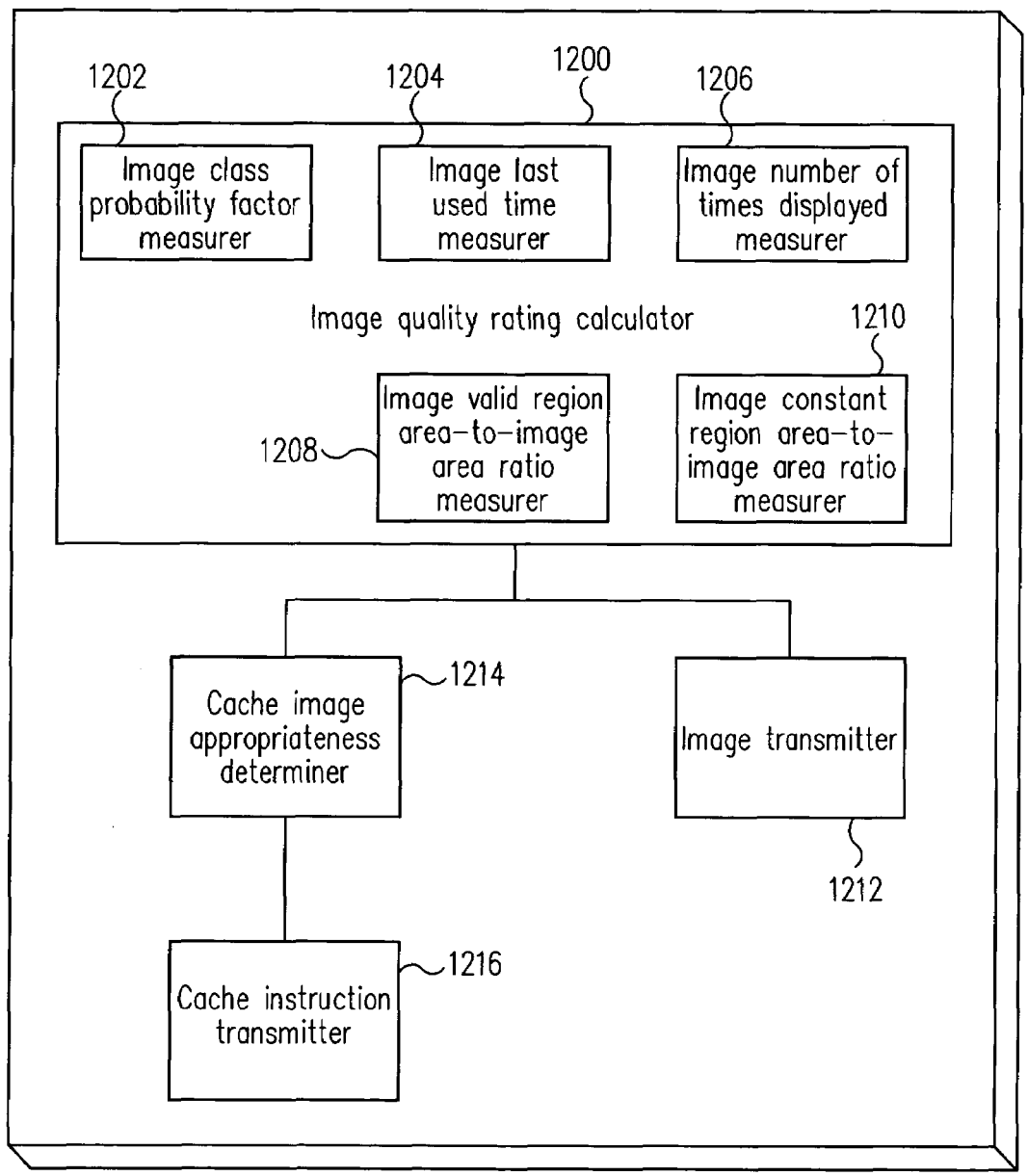
FIG. 12 is a block diagram illustrating an apparatus for managing an image cache in a display computer in a computer system having a host computer and a display computer in accordance with an embodiment of the present invention.

FIG. 12 is a block diagram illustrating an apparatus for managing an image cache in a display computer in a computer system having a host computer and a display computer in accordance with an embodiment of the present invention. An image quality rating calculator 1200 may calculate a quality rating for the image. This may be based on factors such as the probability factor assigned to the image class of the image, the amount of time since the image was last used, the number of times the image has been drawn onto a display, the size of the image, the ratio of the area of a valid region to the area of the image, and the ratio of the area of a constant region to the area of the image. Therefore, the image quality rating calculator 1200 may include an image class probability factor measurer 1202, an image last used time measurer 1204, an image number of times displayed measurer 1206, an image valid region area-to-image area ratio measurer 1208, and/or an image constant region area-to-image area ratio measurer 1210. An image transmitter 1212 coupled to the image quality rating calculator 1200 may transmit the image to the display computer. A cache image appropriateness determiner 1214 coupled to the image quality rating calculator 1200 may determine it is appropriate to cache the image on the display computer, the determination being based on the quality rating of the image. This may be based on whether there is enough room in the cache or if it is possible to create enough room in the cache by removing one or more images with lower quality ratings than the image. If it is deemed appropriate, then a cache instruction transmitter 1216 coupled to the cache image appropriateness determiner 1214 may transmit instructions to the display computer to cache the image.

Figure 13:
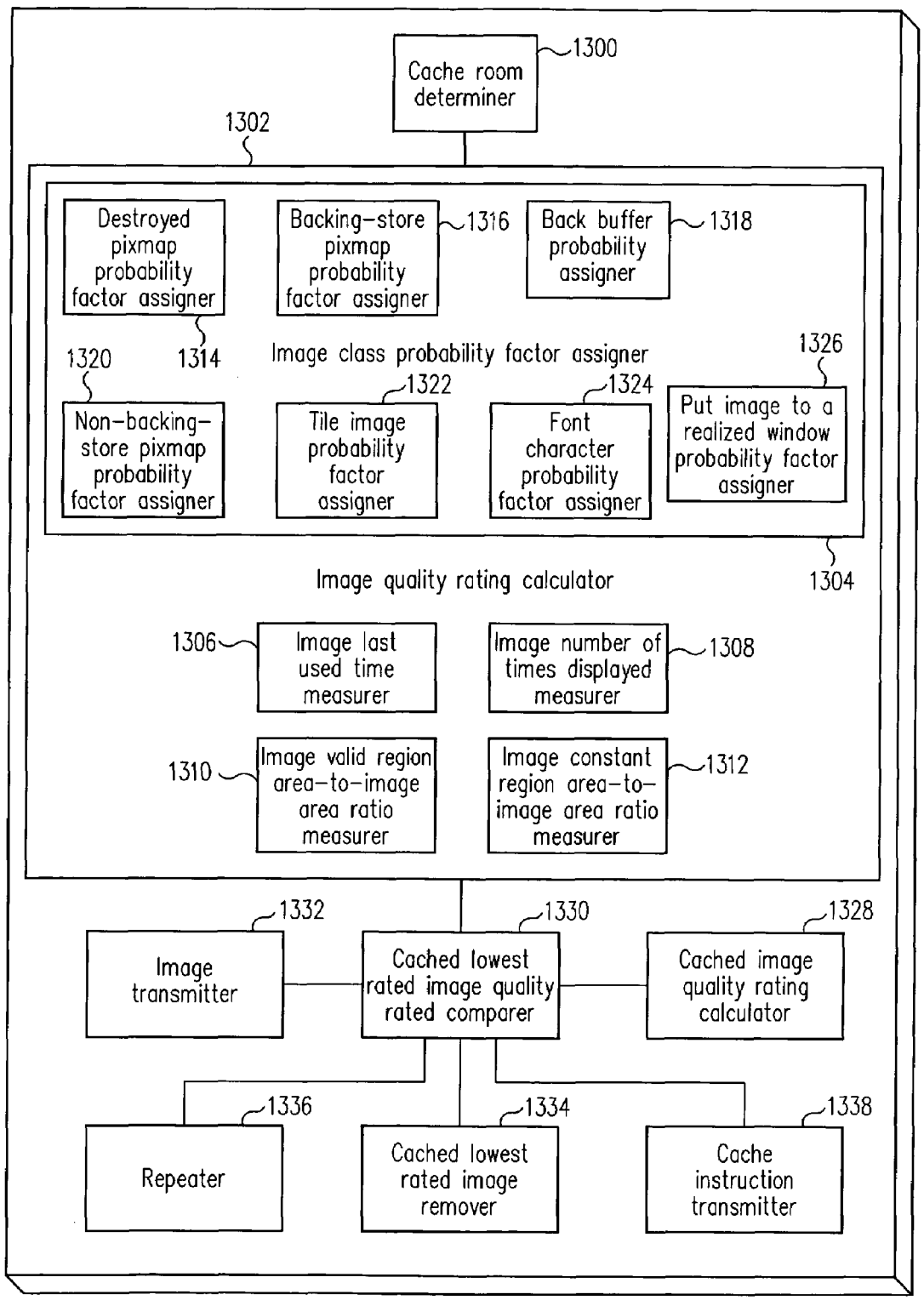
FIG. 13 is a block diagram illustrating an apparatus for managing an image cache in a display computer in a computer system having a host computer and a display computer in accordance with another embodiment of the present invention.

FIG. 13 is a block diagram illustrating an apparatus for managing an image cache in a display computer in a computer system having a host computer and a display computer in accordance with another embodiment of the present invention. A cache room determiner 1300 may determine if there enough room in the cache for the image. If so, there is no reason to remove any current cache entries. If not, then an image quality rating calculator 1302 may calculate a quality rating for the image. This may be based on factors such as the probability factor assigned to the image class of the image, the amount of time since the image was last used, the number of times the image has been drawn onto a display, the size of the image, the ratio of the area of a valid region to the area of the image, and the ratio of the area of a constant region to the area of the image. Therefore, the image quality rating calculator 1302 may include an image class probability factor assigner 1304, an image last used time measurer 1306, an image number of times displayed measurer 1308, an image valid region area-to-image area ratio measurer 1310, and/or an image constant region area-to-image area ratio measurer 1312. The image class probability factor assigner 1304 may include, for example, a destroyed pixmap probability factor assigner 1314, a backing-store pixmap probability factor assigner 1316, a back buffer probability factor assigner 1318, a non-backing-store pixmap probability factor assigner 1320, a tile image probability factor assigner 1322, a font character image probability factor assigner 1324, and/or a put image to a realized window probability factor assigner 1326, depending upon the image class of the image. A cached image quality rating calculator 1328 may then calculate quality ratings for each image in the cache. This may contain similar components to the image quality rating calculator 1302, but for convenience these are not shown in FIG. 13. These also may be based on factors such as the probability factor assigned to the image class of the image, the amount of time since the image was last used, the number of times the image has been drawn onto a display, the size of the image, the ratio of the area of a valid region to the area of the image, and the ratio of the area of a constant region to the area of the image. A cached lowest rated image quality rating comparer 1330 coupled to the image quality rating calculator 1302 and to the cached image quality rating calculator 1328 may determine if a lowest rated image in the cache has a lower quality rating than the image. If not, then an image transmitter 1332 coupled to the cached lowest rated image quality rating comparer 1330 may simply transmit the image and it will not be cached. If so, then a cached lowest rated image remover 1334 coupled to the cached lowest rated image quality rating comparer 1330 may remove the lowest rated image may be removed from the cache. Then it may be determined if there is enough room in the cache for the image. If not, then a repeater 1336 coupled to the cached lowest rated image quality rating comparer 1330 and to the cached lowest rated image remover 1334 may repeat the comparing and removing. If there is enough room in the cache for the image, then the image transmitter 1332 may transmit the image to the display computer. Then a cache instruction transmitter 1338 coupled to the cached lowest rated image quality rating comparer 1330 may transmit instructions to cache the image to the display computer.

Figure 14:
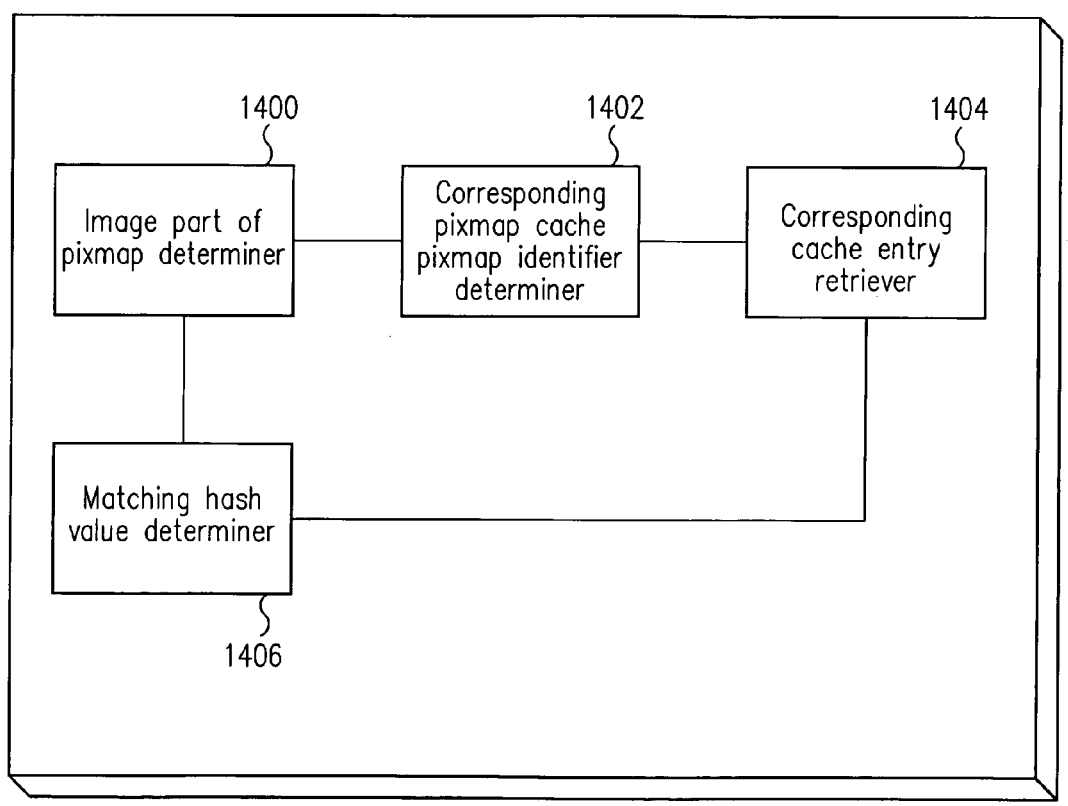
FIG. 14 is a block diagram illustrating an apparatus for retrieving an entry in a cache corresponding to an image, the cache stored by a display computer in a system having a display computer and a host computer in accordance with an embodiment of the present invention.

FIG. 14 is a block diagram illustrating an apparatus for retrieving an entry in a cache corresponding to an image, the cache stored by a display computer in a system having a display computer and a host computer in accordance with an embodiment of the present invention. An image part of pixmap determiner 1400 may determine if the image is part of a pixmap. If so, then a corresponding pixmap cache pixmap identifier determiner 1402 coupled to the image part of pixmap determiner 1400 may determine if a pixmap identifier for the pixmap corresponds to a pixmap already stored in the cache. If so, then a corresponding cache entry retriever 1404 coupled to the corresponding pixmap cache pixmap identifier determiner 1402 may retrieve a portion of the corresponding cache entry from the cache. If not, or if it was determined that the image is not a part of a pixmap, then a matching hash value determiner 1406 coupled to the corresponding cache entry retriever 1404 and to the image part of pixmap determiner 1400 may determine if an image hash value for the image matches an image hash value corresponding to an image in the cache. If so, then the corresponding cache entry retriever 1404 may retrieve the corresponding image from the cache.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for managing an image cache in a display computer in a computer system having a host computer and a display computer, the method comprising:

calculating a quality rating for an image;

determining if it is appropriate to cache said image on the display computer, wherein said determination is based on said quality rating;

transmitting said image to the display computer; and transmitting instructions to the display computer to cache said image if appropriate wherein said quality rating is calculated based on a ratio of the area of a constant region to the area of said image, wherein said constant region keeps track of portions of an image that do not change during successive copies to a screen.

2. An apparatus for managing an image cache in a display computer in a computer system having a host computer and a display computer, the apparatus comprising:

an image quality rating calculator;

a cache image appropriateness determiner coupled to said image quality rating calculator;

an image transmitter coupled to said image quality rating calculator; and a cache instruction transmitter coupled to said cache image appropriateness determiner wherein said image quality rating calculator includes:

an image constant region area-to-image area ratio measurer.

3. An apparatus for managing an image cache in a display computer in a computer system having a host computer and a display computer, the apparatus comprising:

means for calculating a quality rating for an image;

means for determining if it is appropriate to cache said image on the display computer, wherein said determination is based on said quality rating;

means for transmitting said image to the display computer; and means for transmitting instructions to the display computer to cache said image if appropriate wherein said quality rating is calculated based on a ratio of the area of a constant region to the area of said image, wherein said constant region keeps track of portions of an image that do not change during successive copies to a screen.

* * * * *